United States Patent [19]
Eastaugh

[11] Patent Number: 5,572,945
[45] Date of Patent: Nov. 12, 1996

[54] OMNIDIRECTIONAL WIND INDICATOR

[75] Inventor: Reginald C. Eastaugh, Perris, Calif.

[73] Assignee: Constance D. Kennedy, Perris, Calif.

[21] Appl. No.: 296,655

[22] Filed: Aug. 26, 1994

[51] Int. Cl.$^6$ .................................................. G09F 17/00
[52] U.S. Cl. .......................................... 116/173; 116/264
[58] Field of Search .................................. 116/173, 174, 116/175, 264, 265; 73/170.01, 170.05, 170.07

[56] References Cited

U.S. PATENT DOCUMENTS

| | | | |
|---|---|---|---|
| 1,337,237 | 4/1920 | Light | 116/173 |
| 1,339,849 | 5/1920 | Johnson et al. | |
| 1,401,626 | 12/1921 | Mader | 116/173 |
| 1,742,574 | 1/1930 | Breedlove | 116/173 X |
| 2,858,793 | 11/1958 | Palmer | 116/173 |
| 3,081,734 | 3/1963 | Spahl | 116/173 |
| 3,438,651 | 4/1969 | Hertoghe et al. | 116/173 |
| 3,696,334 | 10/1972 | Demeter | 116/173 X |
| 4,123,813 | 11/1978 | Adams | 9/8 R |
| 4,332,210 | 6/1982 | Lambert | 116/173 |
| 4,375,134 | 3/1983 | Sheetz | 40/591 |
| 4,700,655 | 10/1987 | Kirby | 116/174 |
| 4,876,981 | 10/1989 | Barnhart | 116/173 |
| 5,247,900 | 9/1993 | Sobczak | 116/209 |
| 5,267,524 | 12/1993 | Maxwell | 116/174 |

FOREIGN PATENT DOCUMENTS 21645  1/1907  United Kingdom .................. 116/173

Primary Examiner—William A. Cuchlinski, Jr.
Assistant Examiner—Willie Morris Worth
Attorney, Agent, or Firm—Elliott N. Kramsky

[57] ABSTRACT

An omnidirectional wind indicator. An elongated mast is rotatable about its axis with respect to a base support. The mast is of tapered design and flexible, resilient composition with flexibility increasing with distance above the base support. A three-sided flag includes a curvilinear leading edge. A sleeve is formed along the curvilinear edge for receiving the mast. When inserted, the upper end of the mast follows the curvilinear shape of the sleeve. The resulting configuration spring-loads the flexible upper portion of the mast to maintain the flag in taut alignment. Wind velocity is indicated by tails sewn to the trailing edge of the flag and by wings pivotally mounted transverse to the plane of the flag.

8 Claims, 2 Drawing Sheets

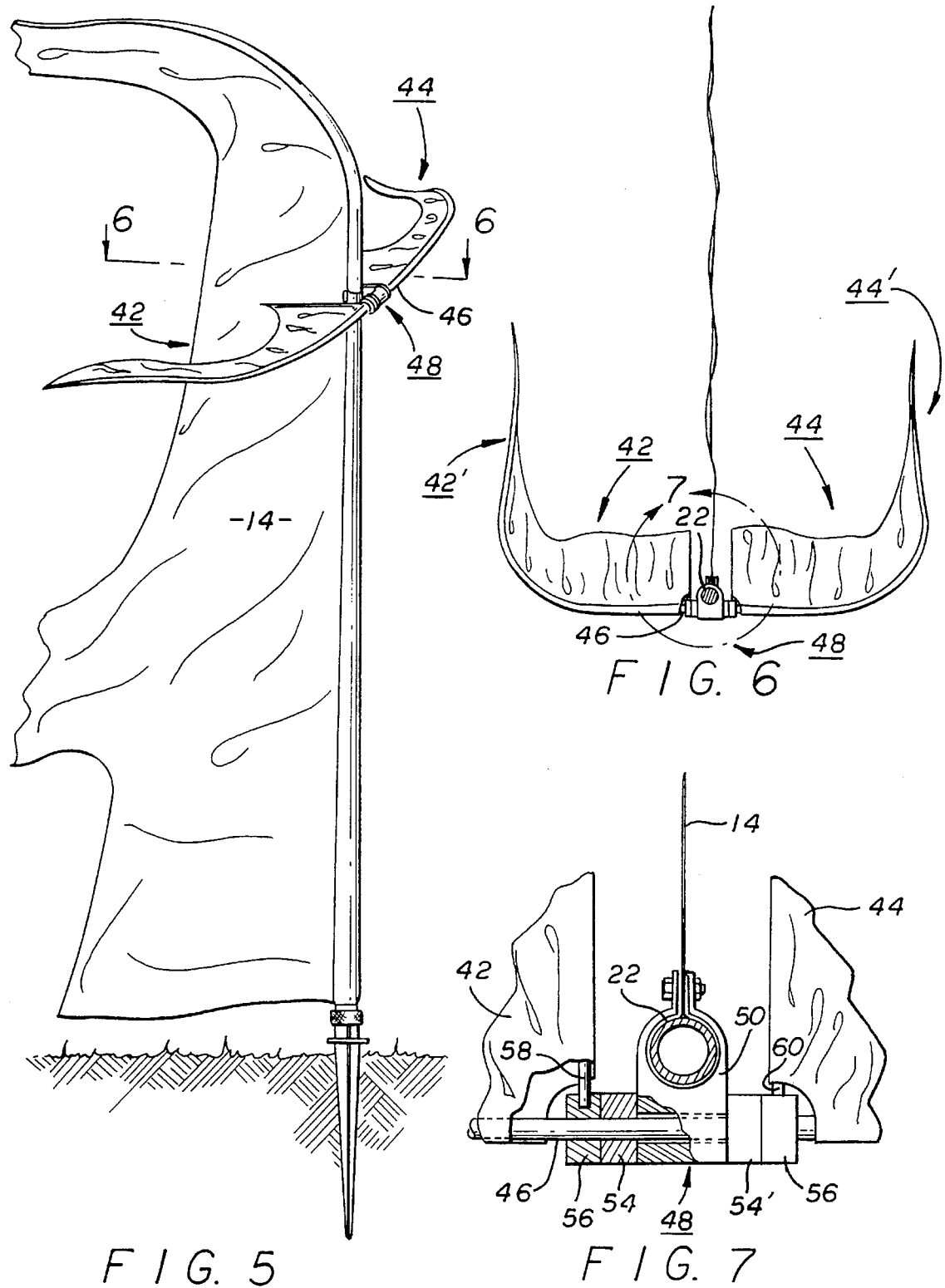

OMNIDIRECTIONAL WIND INDICATOR

BACKGROUND

1. Field of the Invention

The present invention relates to wind indicators. More particularly, this invention pertains to an omni-directional device for providing a skydiver with an indication of the direction and strength of wind in the vicinity of a target area.

2. Description of the Prior Art

Sky diving has become a very popular sport. In it, a participant jumps from a plane, floating to earth with the aid of a parachute. During the fall, it is not at all uncommon to perform acrobatic maneuvers, often in tandem with other divers.

Assuming that a catastrophic failure (e.g., failure of parachute to open) does not occur, the skydiver's maximum injury risk occurs upon ground impact and immediately thereafter. While visual indications of the terrain give an opportunity to adjust descent to avoid hazards, significant injuries can result from the unseen force of ground level wind currents. Often, the direction and magnitude of such currents near a target area are seemingly unrelated to those experienced by the diver during descent from the aircraft. Unforeseen and unexpected currents can result in injury to the chutist through failure to anticipate and prepare properly for target area impact. Should the chutist be aware of the direction of strong ground wind forces at the target site, he can anticipate a need to take actions promptly upon alighting, such as running in the direction of the wind current. In this way, the wind forces can be dissipated and the chutist allowed time to collapse the parachute in a safe manner, avoiding injuries commonly incurred when dragged over terrain upon landing.

The problem of surface wind currents is addressed in skydiving by the well-known "air sock". This indicator comprises an elongated tubular stocking with open opposed ends that is freely mounted upon a post. When the wind comes up, the air sock is extended in a direction parallel to the wind current. In the absence of any significant currents, the sock remains limp.

While helpful, the air sock, which was initially devised as an aid to small aircraft, is relatively insensitive to low level wind currents. In the case of an aircraft, this is not a significant defect. However, a sky diver may experience injury through failure to recognize even relatively-benign ground turbulence.

SUMMARY OF THE INVENTION

The foregoing and other shortcomings of the prior art are addressed by the present invention that provides a wind indicator. A three-sided flag includes a curvilinear edge. An elongated mast is provided. A base is located adjacent to the lower end of the mast. The resilient flexibility of the mast increases with distance from the lower end thereof. A sleeve is formed along the curvilinear edge of the flag for receiving the mast. In this way, the upper portion of the mast assumes a matching curved alignment and exerts tension for retaining the flag in a substantially taut configuration.

The foregoing and other features of the present invention will become further apparent from the detailed description that follows. Such description is accompanied by a set of drawing figures. Numerals of the drawing figures, corresponding to those of the written description, point to the features of the invention. Like numerals refer to like features throughout both the written description and the drawing figures.

BRIEF DESCRIPTION OF THE DRAWINGS

FIG. 5 is a perspective view of a wind indicator in accordance with an alternative embodiment of the invention;

FIG. 6 is a plan view of the alternative embodiment of the invention taken at line 6—6 of FIG. 5 and illustrating the wing assemblies of the alternative embodiment; and FIG. 7 is a detailed view of the manner of attachment of the wing assemblies to the mast taken at circle 7 of FIG. 6.

DESCRIPTION OF THE PREFERRED EMBODIMENT

Figure 1:
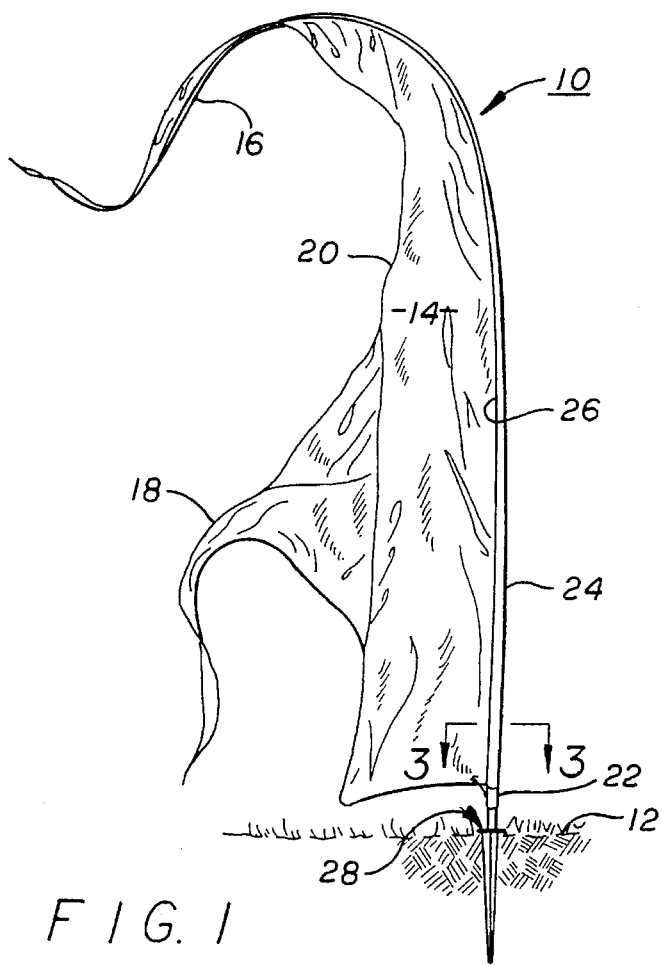
FIG. 1 is a perspective view of the omnidirectional wind indicator of the invention with mast inserted into the ground.

Turning now to the drawings, FIG. 1 is a perspective view of the omnidirectional wind indicator 10 of the invention mounted to terrain 12 in the region of a parachute jump target area. The wind indicator 10 includes a flag 14 with a pair of tails 16 and 18 engaged, preferably by stitching, to the trailing edge 20 of the flag 14. A mast 22, described in detail below, extends the length of, and is received within a sleeve 24 that is sewn along the leading edge 26 of the flag 14.

The wind indicator 10 is arranged to provide a reliable indication of wind direction and strength in the region of the chutist's landing area. In the configuration shown in FIG. 1, the orientation of the flag 14 provides the chutist with an indication of wind direction while the attitudes (vertical vs. horizontal) of the tails 16 and 18 indicate wind strength. As will also be shown below, the mast 22 is designed so that, in combination with the shape and means of engagement thereto, the flag 14 will remain taut and extended during use. This, in combination with the freely-rotatable engagement of the mast 22 to a ground anchor 28 provides a wind indicator 10 that is sensitive to relatively-small wind currents that are undetectable with an "ordinary" flag or a wind sock, each of which is flaccid and therefore subject to collapse and tangling. For such reasons, either of such means may fail to respond quickly to the presence of some wind which might rapidly develop into a dangerous swell. The relatively-large surface area presented by the taut flag 14 maximizes the force of an incident wind current and transfers it into torque for orienting the wind indicator 10 parallel to flow.

The flag 14 comprises a three-sided shape with the leading edge 26 being arcuate or curvilinear. The mast 22, which is tapered from bottom to top and is fabricated of resilient and flexible material, accommodates the curvilinear shape of the leading edge 26 upon insertion into the pocket 24. Thus, as seen in FIG. 1, the mast 22 is bent into a "question mark" shape. Such bend "loads" the mast 22 to exert a reactive force upon the flag 14 in the clockwise direction. This provides the tension in the upper region of the flag 14 that holds it taut and extended even in the absence of a significant wind force.

Figure 2:
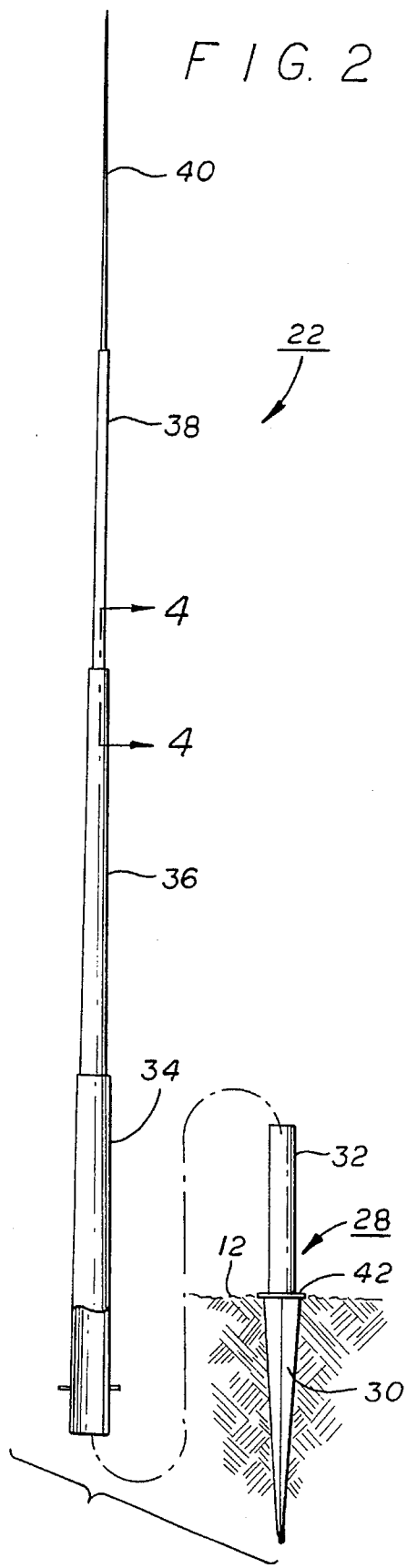
FIG. 2 is an exploded elevational view of the mast and base of the wind indicator.

FIG. 2 is an exploded elevational view of the mast 22 and the base support 28 with which it interacts. As can be seen, the base support 28 includes a dagger-like anchor 30 for affixing to the terrain 12 and an above-ground vertical cylinder 32 for capturing the lower segment 34 of the mast 22.

The mast 22 is formed of four tapered, mutually-telescoping segments 34 through 40. Each of the segments is preferably hollow with the bottom segment 34 dimensioned to fit over the vertical cylinder 32 of the base support 28. Sufficient dimensional tolerance is provided therebetween to permit rotation of the mast 22 about its vertical axis. A horizontal plate 42 is provided for seating the bottom of the lower segment 34. This provides a relatively-frictionless surface whereby rotation of the mast will not be impeded by the texture of the terrain 12.

As can be seen, each of the four telescoping segments 34 through 40 is individually tapered. In addition, the average diameter of each segment decreases as one proceeds from the base of the mast 22 to the top.

Figure 3:
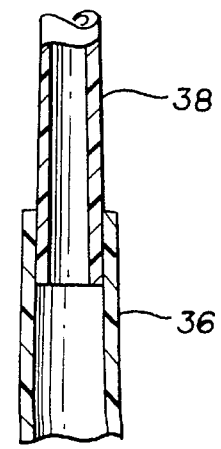
FIG. 3 is a cross-sectional view of the mast and leading edge of the flag taken at line 3—3 of FIG. 1 for illustrating the sleeve whereby the flag is fitted to the mast.

The mast 22 may be of any appropriate resilient and flexible plastic or like material. FIG. 3 is a cross sectional view of the mast 22, with the flag 14 engaged thereto, taken at line 3—3 of FIG. 1. As may be observed, the sleeve 24 for insertion of the mast 22 is sewn to the region of the leading edge 26 of the flag 14. Referring to the preceding figures, it can be seen that, by inserting the mast into the sleeve 26, whose contour follows the curvilinear contour of the leading edge 26 of the flag 14, the mast 22 is necessarily caused to flex in its upper regions to induce a loading force for maintaining the flag 14 taut.

Figure 4:
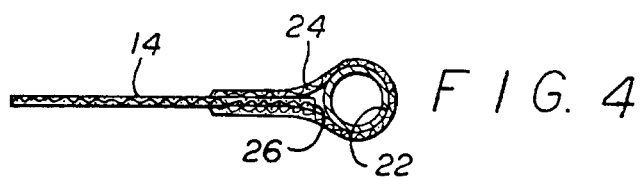
FIG. 4 is a side sectional view of the mast taken at line 4—4 of FIG. 2 in the region of the junction between a telescoping pair of mast elements.

FIG. 4 is a side sectional view of the mast 22 taken at line 4—4 of FIG. 2 in the region of the junction between a telescoping pair of pole segments 36 and 38. By providing a segmented and telescoping mast 22, the invention offers a relatively-compact storage configuration. This facilitates transport of the device to remote locations, enhancing its utility.

FIG. 5 is a perspective view of a flag 14 in accordance with an alternative embodiment of the invention. In this embodiment, wings 42 and 44 are arranged transverse to the plane of the flag 14. The wings 42 and 44 are reinforced at their leading edges by a common rod 46 of flexible fiberglass or like material. The wings 42 and 44 are arranged to facilitate the chutist's ability to determine both wind direction and strength while descending. The wing structure is pivotally fixed to the mast 22 by means of a fitting 48 described in detail with reference to FIG. 7 below.

The wings 42 and 44, by virtue of the reinforcement provided by various rods, including the rod 46, remain taut regardless of wind conditions. Due to their common fixture to the shaft 22 by means of the fitting 48, the wings 42 and 44 provide the chutist with a clearer and more readily visible indication of wind direction from above than does the flag 14 itself. This is made apparent from FIG. 6, a plan view taken at line 6—6 of FIG. 5. This view illustrates the appearance of the wind indicator 10 to an airborne chutist. As can be seen, the planar surfaces of the wings 42 and 44, rotatable with the mast 22 through the fitting 48, provide a clearly visible indication of wind direction from above. This gives the chutist with a much earlier (i.e., higher altitude) indication of wind direction than the thin, linear silhouette presented by the flag 14. Further, the shapes and attitudes of the wings provide the skydiver with an indication of wind strength in the vicinity of the target area.

The common rod 46 is received in sleeves sewn along the leading edges of the wings 42 and 44. The rod is of flexible material, such as fiberglass, and tapered as it extends outwardly from the mast 22. As a result, the tips of the wings 42 and 44 are quite flexible and susceptible to bending in strong wind currents. Accordingly, while descending, the chutist may judge wind strength by the quite visible shapes of the wings 42 and 44. More specifically, the more pronounced the rearward bends or sweeps of the tip areas 42' and 44' of the wings 42 and 44 respectively, the greater the strength of the wind in the target area.

The attitudes of the wings 42 and 44 provide additional indications of wind velocity. FIG. 7 is a detailed view of the manner of attachment of the wings 42 and 44 to the mast 22 taken at circle 7 of FIG. 6. As shown, the fitting 48 generally comprises a clamp 50 that is fixed to the rotatable mast 22. A transversely bored hole 52 is provided to receive the rod 46, assuring that the wings 42 and 44 will rotate with the mast 22. Spacers 54 and 54' separate the wings 42 and 44 from the edges of the clamp 50. Rotatable carriers 56 and 56' are adjacent the spacers 54 and 54'. Each carrier is rotatable about the axis of the rod 46 and includes a rear channel for receiving an inner edge support rod 58, 60. The inner edge support rods 58 and 60 sustain the desired shapes of the wings 42 and 44 respectively in the absence of strong wind.

The rotatable carriers 56 and 56' are pivotal about the rod 46 to permit the trailing edges of the wings 42 and 44 to slope downwardly in the absence of a strong wind. This provides the chutist with a further indication of wind strength. In fact, an experienced diver can obtain a relatively accurate indication of wind strength by first observing the tilts to the wings 42 and 44 from horizontal. In the event that "full horizontal" attitudes are observed, a threshold of wind strength will be appreciated. The precise degree of strength above such threshold can then be ascertained through observation of the degree of sweeps of the tip areas 42' and 44'.

Thus it is shown that the present invention provides an omnidirectional wind indicator. By employing the teachings of this invention, one can improve the reliability and safety of sky diving by realizing the benefits of a reliable indicator of target wind conditions. The wind indicator is highly sensitive to changes of direction and magnitude and readily visible to the chutist.

While this invention has been described with reference to its presently preferred embodiment it is not limited thereto. Rather, this invention is limited only insofar as it is described by the following set of patent claims and includes within its scope all equivalents thereof.

What is claimed is:

1. A wind indicator comprising, in combination:
   a) a three-edged fabric flag including a curvilinear edge;
   b) a substantially straight elongated mast of resilient and flexible material;
   c) said mast being rotatably received at a lower end on a base;
   d) said mast being tapered from its lower to its upper end;
   e) a sleeve located along said curvilinear edge of said flag for receiving said resilient mast; and
   f) said resilient mast being loaded into said curvilinear sleeve whereby said mast assumes a matching curved alignment that exerts a tension force upon a portion of said flag.

2. A wind indicator as defined in claim 1 wherein at least one elongated tail is affixed to a trailing edge of said flag.

3. A wind indicator as defined in claim 1 wherein said base further includes:

a) a dagger-like member; and b) a cylindrical member for rotatably engaging the lower end of said mast.

4. A wind indicator as defined in claim 1 wherein said mast comprises a plurality of telescoping segments.

5. A wind indicator as defined in claim 4 wherein each of said segments is tapered toward its upper end.

6. A wind indicator as defined in claim 1, further including:

a) a pair of wings, each of said wings being oriented substantially transverse to said flag;

b) each of said wings including a fabric portion bounded by three edges;

c) a sleeve being formed along a leading edge of each of said fabric portions of said wings;

d) a first rod, said first rod being received within each of said sleeves;

e) means for securing said first rod to said mast, said means being located intermediate said leading edges of said fabric portions of said wings whereby said wings are positioned at opposite sides of said flag; and f) said means for securing including means for permitting pivotal movement of said first rod with respect to said mast.

7. A wind indicator as defined in claim 6 wherein said rod is tapered such that the flexibility of said rod increases with distance from said mast.

8. A wind indicator as defined in claim 6 wherein each of said wings further includes a second rod for reinforcing an inner edge thereof.

\* \* \* \* \*